(12) United States Patent
Mutikainen et al.

(10) Patent No.: US 8,891,482 B2
(45) Date of Patent: Nov. 18, 2014

(54) SESSION CONTINUITY IN COMMUNICATION NETWORKS

(75) Inventors: Jari Mutikainen, Lepsämä (FI); Georg Mayer, Helsinki (FI); Mari Melander, Espoo (FI)

(73) Assignee: Nokia Corporation, Espoo (FI)

( * ) Notice: Subject to any disclaimer, the term of this patent is extended or adjusted under 35 U.S.C. 154(b) by 2002 days.

(21) Appl. No.: 11/651,897

(22) Filed: Jan. 9, 2007

(65) Prior Publication Data

US 2008/0165764 A1 Jul. 10, 2008

(51) Int. Cl.
H04W 4/00 (2009.01)

(52) U.S. Cl.
USPC ........... 370/331; 370/338; 370/352; 370/400; 455/437; 455/438; 455/439; 455/440

(58) Field of Classification Search
USPC ......................................... 370/328, 338, 331
See application file for complete search history.

(56) References Cited

U.S. PATENT DOCUMENTS

| | | | |
|---|---|---|---|
| 2004/0008669 A1* | 1/2004 | Bos et al. ...................... | 370/352 |
| 2004/0073685 A1* | 4/2004 | Hedin et al. .................. | 709/228 |

FOREIGN PATENT DOCUMENTS

| | | |
|---|---|---|
| EP | 1 370 056 A1 | 6/2002 |
| EP | 1 487 221 A1 | 12/2004 |
| JP | 2005057551 A | 3/2005 |
| JP | 2005-341310 A2 | 12/2005 |
| JP | 2006-512868 | 4/2006 |
| JP | 2006519553 A | 8/2006 |
| JP | 2007-509543 | 4/2007 |
| KR | 101051671 B1 | 7/2011 |
| WO | WO 2004/073279 A1 | 8/2004 |
| WO | WO-2005/109796 A1 | 11/2005 |
| WO | WO-2006/001740 A1 | 1/2006 |
| WO | WO-2007/001645 A1 | 1/2007 |

OTHER PUBLICATIONS

3GPP TS 23.228, V7.6.0 (2006-12), "3rd Generation Partnership Project; Technical Specification Group Services and System Aspects; IP Multimedia Sybsystem (IMS); Stage 2 (Release 7)", 215 pgs.
3GPP TS 24.229, V7.6.0 (2006-12), "3rd Generation Partnership Project; Technical Specification Group Core Network and Terminals; IP multimedia call control protocol (SIP) and Session Description Protocol (SDP); Stage 3 (Release 7)", 401 pgs.
"3rd I Generation Partnership Project; Technical Specification Group Services and System Aspects; Combining Circuit Switched (CS) and IP Multimedia Subsystem (IMS) services; Stage 2 (Release 7)", 3GPP TS 23.279 V7.4.0, Sep. 2006, 27 pgs.

* cited by examiner

*Primary Examiner* — Alvin Zhu
(74) *Attorney, Agent, or Firm* — Harrington & Smith

(57) ABSTRACT

Disclosed is a method including having an ongoing communication session via a packet switched network, transferring said communication session from the packet switched network to a second network providing both packet and circuit switched access, and informing an application server maintaining said ongoing communication session that the communication session is to be split into a packet switched part and a circuit switched part. Also disclosed is a method in an application server, including receiving, from a first communication device, an indication that a communication session between the first communication device and a second communication device is to be split into a packet switched part and a circuit switched part, waiting for to receive transfer requests of both the packet switched part and the circuit switched part, and informing the second communication device of the split.

32 Claims, 5 Drawing Sheets

500

600

SESSION CONTINUITY IN COMMUNICATION NETWORKS

FIELD OF THE INVENTION

The present invention generally relates to session continuity in communication networks comprising mobile nodes.

BACKGROUND OF THE INVENTION

A user equipment (UE) or a mobile node may be allowed to be registered to an IMS (IP Multimedia Subsystem) via different access technologies at the same time. For example WLAN (Wireless Local Area Network) access and UTRAN (UMTS Terrestrial Radio Access Network) access may be allowed in parallel. The parallel use of different access technologies may allow service continuity for example when a mobile user moves out of WLAN coverage and at the same time enters UTRAN coverage.

VCC (Voice Call Continuity) is a technology defined by 3GPP ($3^{rd}$ Generation Partnership Project) that provides a possibility to transfer a voice call ongoing in an IMS domain to a CS (circuit switched) domain and vice versa without disrupting the call. There are however unresolved issues relating to service continuity when transferring from one network access technology to another.

Let's assume the following scenario: First, a UE_A is registered to an IMS via WLAN (A_WLAN). Then, the user of the UE_A moves into an area where the WLAN coverage gets weaker but UTRAN is available. Therefore, the UE_A registers to the IMS via UTRAN GPRS (General Packet Radio Services) (A_GPRS) in parallel with the WLAN registration. In result, the UE_A has two parallel IMS registrations.

Now, the UE_A can start to transfer its ongoing SIP (Session Initiation Protocol) dialogs (that is, ongoing multimedia sessions, subscriptions e.g. to presence information, etc.) from A_WLAN to A_GPRS. This procedure may be referred to as PS-to-PS handover (packet switched-to-packet switched handover).

The UE_A may also have an ongoing multimedia session (for example, SIP INVITE initiated) that includes an audio part, as well as another RTP (Real Time Transport Protocol) transported media, such as a video share. In this case, the UE_A may desire that the audio part of this session is to be handled via a CS domain, whilst the video part should be handled via IMS (A_GPRS).

There are three major issues in this scenario:
1. IMS PS-to-PS handover,
2. Voice Call Continuity, and
3. splitting the voice from other media.

It is not yet certain how these issues should be handled in order to ensure service continuity both for the voice and other media. It is likely that in current solutions one or the other of the voice and other media may be discontinued when performing the transfer. Thus further considerations are needed.

SUMMARY OF THE INVENTION

According to a first aspect of the invention there is provided a method comprising having an ongoing communication session via a packet switched network, transferring said communication session from the packet switched network to a second network providing both packet and circuit switched access, and informing an application server maintaining said ongoing communication session that the communication session is to be split into a packet switched part and a circuit switched part.

The method may further comprise sending transfer requests of the packet switched part and the circuit switched part, and including at least in one of the transfer requests an indication that the communication session is to be split.

In an embodiment of the invention the informing is conducted by sending in parallel the transfer requests of the packet switched part and the circuit switched part, both of the transfer requests comprising an indication that the communication session is to be split.

In another embodiment of the invention the informing is conducted by sending the transfer request of the packet switched part, the request comprising an indication that the communication session is to be split, waiting for to receive a response to the transfer request for the packet switched part, and sending the transfer request of the circuit switched part in response to receiving said response.

In yet another embodiment of the invention the informing is conducted by sending the transfer request of the circuit switched part, the request comprising an indication that the communication session is to be split, waiting for to receive a response to the transfer request for the packet switched part, and sending the transfer request of the packet switched part in response to receiving said response.

In still another embodiment of the invention the informing is conducted by sending an indication message comprising an indication that the communication session is to be split, waiting for to receive a response to the indication message, and sending transfer requests of the packet switched part and the circuit switched part in response to receiving said response.

According to a second aspect of the invention there is provided a method in an application server, comprising receiving, from a first communication device, an indication that a communication session between the first communication device and a second communication device is to be split into a packet switched part and a circuit switched part, waiting for to receive transfer requests of both the packet switched part and the circuit switched part, and informing the second communication device of the transfers of the packet switched part and the circuit switched part.

By informing the second communication device of the transfers of the packet switched part and the circuit switched part the application server effectively informs the second communication device of the split of the session.

The method in an application server may further comprise receiving said indication as part of at least one of the transfer request of the packet switched part and the transfer request of the circuit switched part.

In an embodiment of the invention the method in an application server further comprises receiving said indication as part of the transfer request of the packet switched part, sending a response confirming receipt of the transfer request of the packet switched part, and waiting for to receive the transfer request of the circuit switched part.

In another embodiment of the invention the method in an application server further comprises receiving said indication as part of the transfer request of the circuit switched part, sending a response confirming receipt of the transfer request of the circuit switched part, and waiting for to receive the transfer request of the packet switched part.

In yet another embodiment of the invention the method in an application server further comprises receiving an indication message comprising said indication, sending a response confirming receipt of the indication message, and waiting for to receive a transfer requests of the packet switched part and the circuit switched part.

Depending on a specific embodiment of the invention a transfer request of the packet switched part may be for example one of the following:

an invite message comprising a domain transfer URI and a pointer to said communication session, and a SIP INVITE comprising VDI (VCC Domain Transfer URI) in Request URI and a session identifier pointing to said communication session.

Depending on a specific embodiment of the invention a transfer request of the circuit switched part may be for example one of the following:

a setup message comprising said indication in a specific information element, a setup message with a specific domain transfer number, the specific domain transfer number constituting said indication, a CS SETUP message comprising said indication in a User-to-User-Signalling Information Element, a CS SETUP message with a specific VDN (VCC Domain Transfer Number), the specific VDN constituting said indication, and a CS SETUP message according to known VCC procedures.

According to a third aspect of the invention there is provided a signal arranged to be transmitted from a first communication device to an application server maintaining a communication session between the first communication device and a second communication device, the signal comprising an indication that said communication session is to be split into a packet switched part and a circuit switched part.

The signal may be a transfer request of the packet switched part or a transfer request of the circuit switched part or a separate indication message.

According to a fourth aspect of the invention there is provided a communication device, comprising an input/output unit operable to have an ongoing communication session via a packet switched network, a processing unit configured to transfer said communication session from the packet switched network to a second network providing both packet and circuit switched access, wherein the processing unit is further configured to inform an application server maintaining said ongoing communication session that the communication session is to be split into a packet switched part and a circuit switched part.

According to a fifth aspect of the invention there is provided an application server, comprising an input operable to receive, from a first communication device, an indication that a communication session between the first communication device and a second communication device is to be split into a packet switched part and a circuit switched part, and a processing unit configured to wait for to receive transfer requests of both the packet switched part and the circuit switched part, and to inform the second communication device of the transfers of the packet switched part and the circuit switched part.

According to a sixth aspect of the invention there is provided a system, comprising a first communication device, a second communication device, and an application server, wherein the first and the second communication device are operable to have an ongoing communication session between them via a packet switched network, the first communication device comprises a processing unit configured to transfer said communication session from the packet switched network to a second network providing both packet and circuit switched access, and to provide to the application server an indication that the communication session is to be split into a packet switched part and a circuit switched part, and wherein the application server comprises an input operable to receive said indication and a processing unit configured to wait for to receive transfer requests of both the packet switched part and the circuit switched part, and to inform the second communication device of the transfers of the packet switched part and the circuit switched part.

According to a seventh aspect of the invention there is provided a memory medium comprising computer executable program code adapted to enable an apparatus to perform the method of the first aspect.

According to an eighth aspect of the invention there is provided a memory medium comprising computer executable program code adapted to enable an apparatus to perform the method of the second aspect.

It should be appreciated that subject matter of one embodiment related to one aspect may be combined with some other aspect or embodiment where applicable.

BRIEF DESCRIPTION OF THE DRAWINGS

The invention will be described, by way of example only, with reference to the accompanying drawings in which.

DETAILED SPECIFICATION

In the following description, like numbers denote like parts.

Figure 1A:
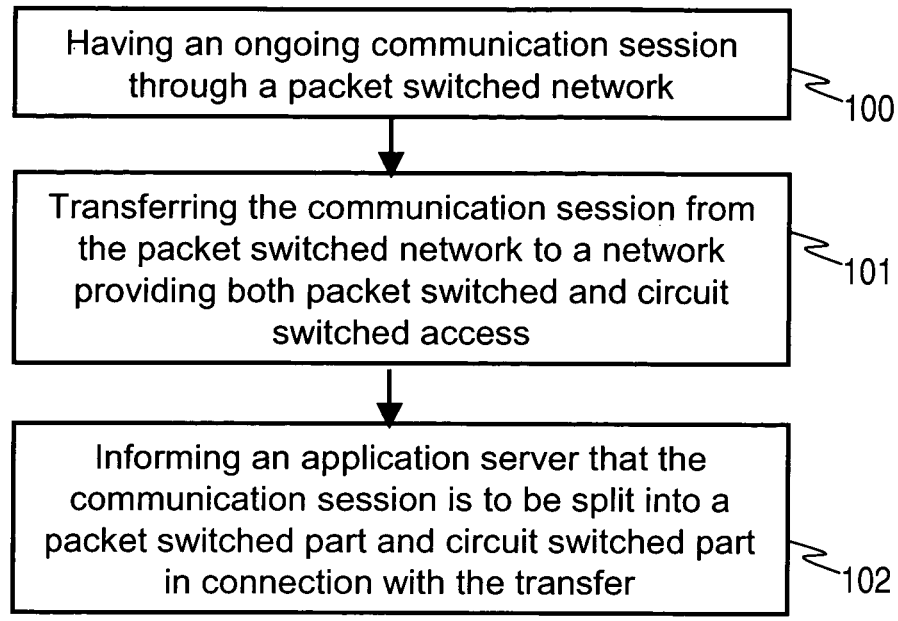
FIG. 1A shows a flow chart of a method according to an embodiment of the invention.

FIG. 1A shows a flow chart of a method according to an embodiment of the invention. The shown method is meant to be performed for example in a communication device.

First in phase 100, the communication device has an ongoing communication session through a packet switched network. Then in phase 101, the communication device transfers the communication session from the packet switched network to a network providing both packet and circuit switched access. The communication session may be transferred for example from a WLAN network to an UTRAN network, if the user of the communication device moves into an area where WLAN coverage gets weaker but UTRAN is available. In connection with the transfer, the communication device informs in phase 102 an application server maintaining the communication session that the communication session is to be split into a packet switched part and a circuit switched part in the network providing both packet and circuit switched access. The application server may be for example an application server handling procedures relating to continuity of voice calls.

In order to effect the transfer and the split of the session the communication device sends to the application server a transfer request of the circuit switched part and a transfer request of the packet switched part. The informing may be effected as part of one or both of the transfer requests, or by a separate message. By being informed of the split the application server knows to wait for the transfer request of both the circuit switched part and the packet switched part. More specific examples of the process are discussed below in connection with FIGS. 2-4.

Figure 1B:
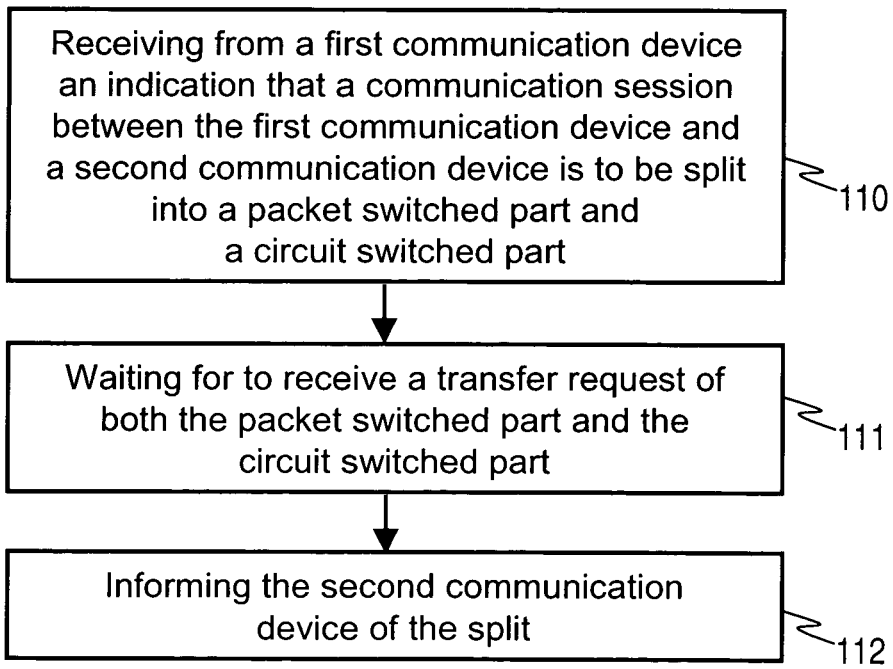
FIG. 1B shows a flow chart of a method according to another embodiment of the invention.

FIG. 1B shows a flow chart of a method according to an embodiment of the invention. The shown method is meant to be performed for example in an application server of a communication network, which may be for example an application server handling procedures relating to continuity of voice calls.

In phase 110 an indication that a communication session between a first communication device and a second communication device is to be split into a packet switched part and a circuit switched part is received from the first communication device. This may be in connection with the first communication device transferring from one network access type to another network access type. Then in phase 111, the application server waits for to receive a transfer request of both the packet switched part and the circuit switched part, and after receiving them the application server informs the second communication device of the split in phase 112. In this way the application server is able to inform the second communication device of both the circuit switched part and the packet switched part, whereby both parts may be allowed to continue undisrupted. In some embodiments of the invention, the step 112 may precede the step 111.

Figure 2:
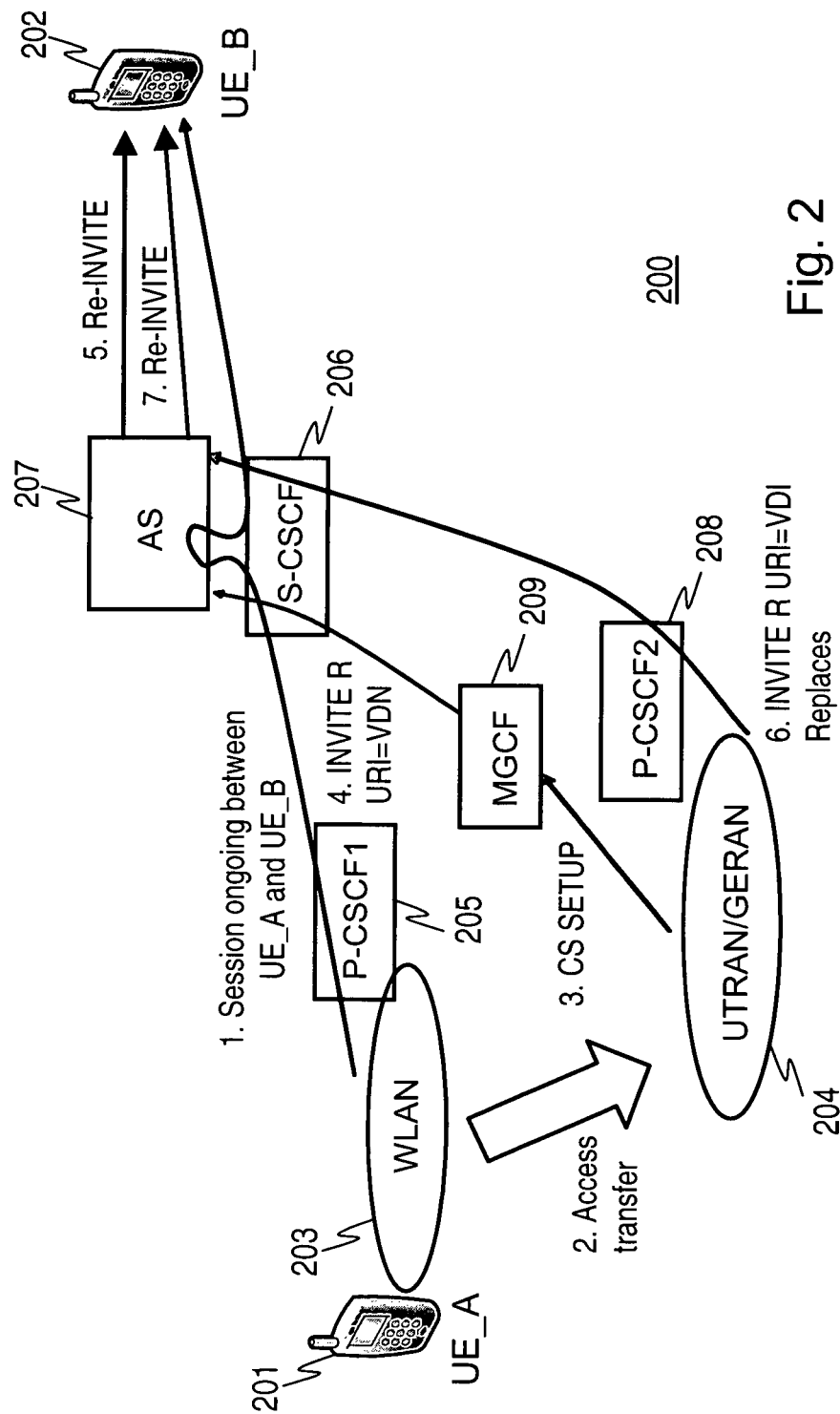
FIG. 2 shows a system according to an embodiment of the invention.

FIG. 2 shows a system 200 according to an embodiment of the invention. The system comprises a UE_A 201 and a UE_B 202 communicating with each other. The UE_A 201 may have communication network access via a WLAN network 203 or an UTRAN/GERAN (for example, a GSM Edge Radio Access Network) network 204. The WLAN network is connected to a P-CSCF1 (Proxy Call Session Control Function) element 205, which is connected to a S-CSCF (Serving Call Session Control Function) element 206. The S-CSCF element 206 co-operates with an application server AS 207. The application server may be for example a VCC AS (Voice Call Continuity AS). Also the UTRAN/GERAN network 204 has a P-CSCF element P-CSCF2 208, which is connected to the S-CSCF element 206. For the purpose of circuit switched connections the UTRAN/GERAN network 204 is connected to a MGCF (Media Gateway Control Function) element 209, which is also connected to the S-CSCF element 206. It should be appreciated that an actual implementation may comprise various other network elements, but they are not of importance with regard to this invention.

Now the operation of an embodiment of the invention in the system 200 of FIG. 2 is discussed (depicted by the three arrows shown in FIG. 2). First (1) there is an ongoing session between the UE_A 201 and the UE_B 202 via the WLAN network 203 and P-CSCF1 205, S-CSCF 206 and AS 207 elements. The ongoing session comprises a voice part and another media part. Then (2) the UE_A transfers access to the UTRAN/GERAN network 204. The UE_A does not terminate the registration to the WLAN network (yet), but maintains parallel registration to the WLAN network and the UTRAN/GERAN network.

In order to effect transfer of the voice part of the ongoing session to the UTRAN/GERAN network the UE_A sends (3) to the MGCF element 209 a CS SETUP message towards VDN (VCC Domain Transfer Number) according to known VCC procedures. On the basis of the CS SETUP message the MGCF sends (4) through the S-CSCF 206 to the AS 207 a SIP INVITE with Request URI=VDN. On receipt of this INVITE the AS sends to the UE_B a Re-INVITE (5) informing the UE_B of the transfer of the voice part.

In order to effect transfer of the other media part of the ongoing session to the UTRAN/GERAN network the UE_A sends (6) through the P-CSCF2 208 and S-CSCF 206 to the AS 207 a SIP INVITE with Request URI=VDI (VCC Domain Transfer URI) and a session identifier, for example a Replaces header or R-URI, pointing to the ongoing session. On receipt of this INVITE the AS sends to the UE_B a Re-INVITE (7) informing the UE_B of the transfer of the other media part.

It should be noted that in prior art solutions, the Re-INVITE (5) removes the other media part from the ongoing session and the Re-INVITE (7) removes the voice part from the ongoing session. Thereby according to an embodiment of the invention, the AS should wait for both of the INVITES (4) and (6) before sending the Re-INVITES (5) and (7) in order to reduce discontinuity in the media flow. The AS may also combine the Re-INVITES (5) and (7) into one Re-INVITE informing the UE_B of the transfer of both voice and other media part, whereby a minimal disruption to the media flow may be achieved.

Figure 3:
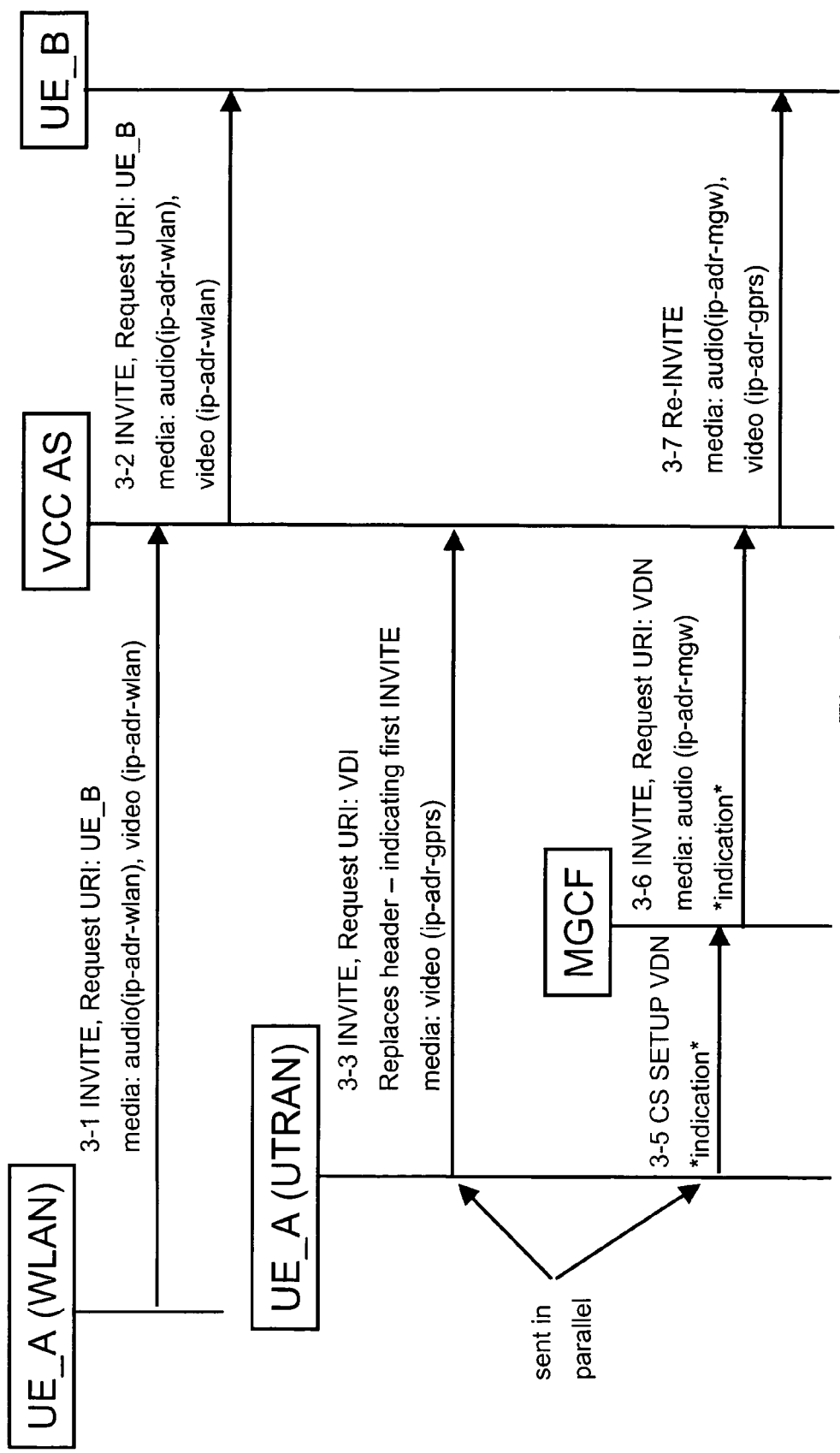
FIG. 3 shows a messaging diagram according to an embodiment of the invention.
Figure 4:
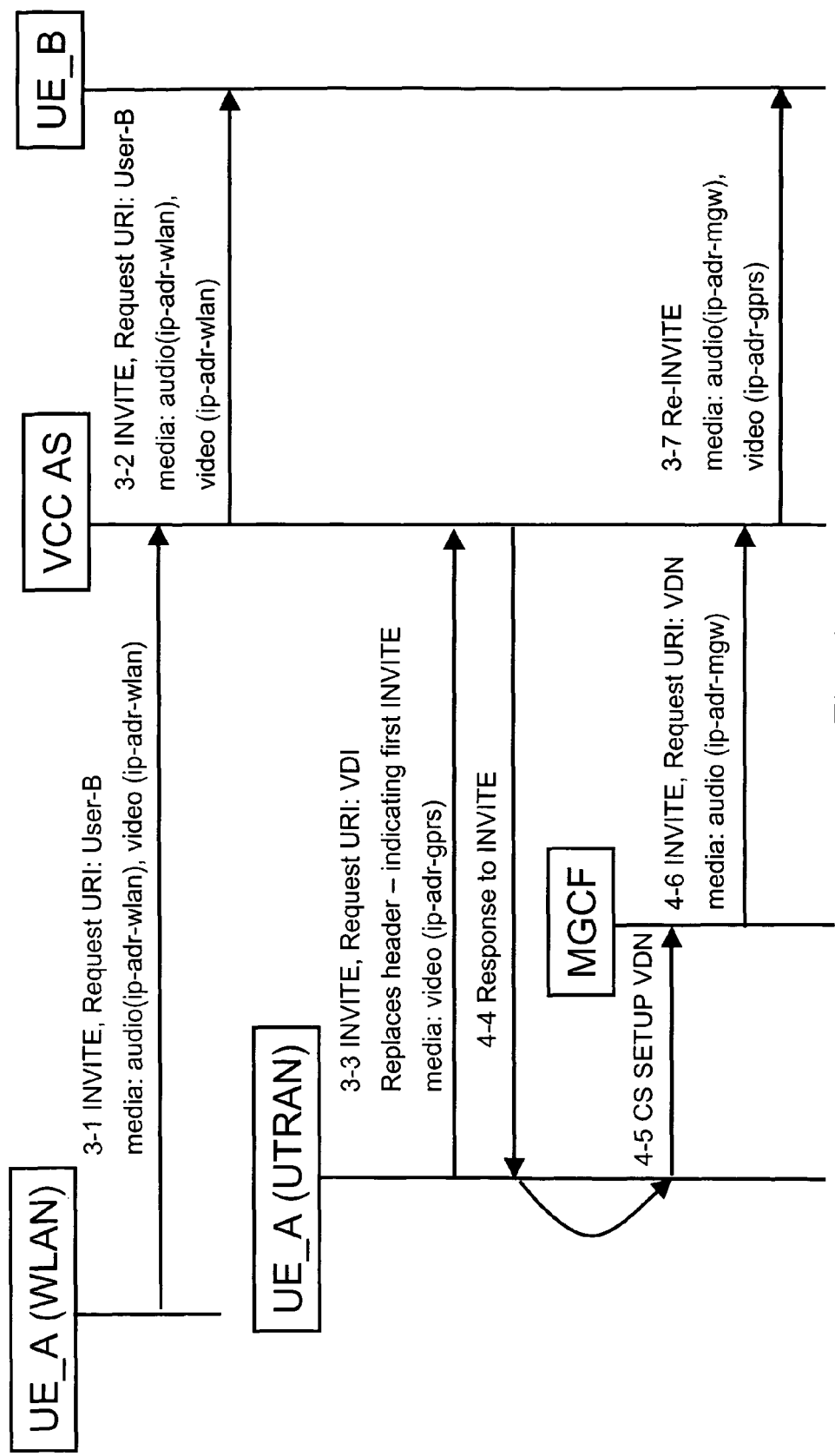
FIG. 4 shows a messaging diagram according to another embodiment of the invention.

Embodiments illustrated in messaging diagrams of FIGS. 3 and 4 relate to possible ways of informing for example the AS 207 of FIG. 2 about a need to split a communication session into a circuit switched and a packet switched part so that the AS knows to wait for INVITES (or other transfer requests) relating to both parts.

In FIG. 3 a UE_A first sets up via a WLAN network a communication session with a UE_B by sending a SIP INVITE 3-1 for a session comprising both audio and video. VCC AS forwards the SIP INVITE 3-2 to the UE_B. Later on the UE_A transfers to an UTRAN network. In order to effect the transfer the UE_A sends in parallel a SIP INVITE 3-3 for transferring the other media part and a CS SETUP message 3-5 for transferring the voice part.

The SIP INVITE 3-3 comprises VDI as request URI and a session identifier (pointing to the ongoing session). The session identifier may be for example a Replaces header. The CS SETUP message 3-5 differs from corresponding messages known in prior art in that it includes an indication that media splitting is desired. A MGCF receives the CS SETUP message 3-5 and sends on the basis of that a SIP INVITE 3-6 comprising VDN as request URI. Also indication of the desired media split is included in the SIP INVITE 3-6.

The indication included in the CS SETUP message 3-5 may be for example:
a new indication within the User-to-User-Signalling Information Element of the CS SETUP message, or
a specific VDN.

Additionally the indication may be, for example, an agreed bit pattern, which the application server knows to be an indication of that media splitting is desired. However as is evident to the skilled person, there are an infinite number of equivalent possibilities to implement such indication. The only requirement is that the application server needs to be able to recognize that the indication is an indication of that media splitting is desired. In some embodiments, a single bit in a field may suffice.

The VCC AS receives the SIP INVITEs 3-3 and 3-6. It should however be noted that either one of the SIP INVITE 3-3 and the SIP INVITE 3-6 may arrive at the VCC AS first. If the VCC AS receives the SIP INVITE 3-3 first, the VCC AS knows on the basis of the session identifier, and the VDI included in the SIP INVITE 3-3 that in this scenario media splitting needs to be performed and thus knows to wait for the other SIP INVITE 3-6. That is, the session identifier and the VDI in the SIP INVITE 3-3 constitute an indication of that media splitting is desired. It should be noted that the SIP INVITE 3-3 may also include some other indication of that media splitting is desired.

If the VCC AS receives the SIP INVITE 3-6 first, the VCC AS knows on the basis of the indication included in the SIP INVITE 3-6 that in this scenario media splitting needs to be performed and thus knows to wait for the other SIP INVITE 3-3. Herein one should note that if the CS SETUP 3-5 and the SIP INVITE 3-6 do not include an indication of the desired media split, the VCC AS would assume normal VCC procedure and would not expect the SIP INVITE 3-3 to arrive. Therefore the VCC AS would drop the other media part of the ongoing communication session.

After receiving both invites 3-3 and 3-6 the VCC AS sends a Re-INVITE 3-7 to the UE_B, the Re-INVITE 3-7 indicating transfer of both the voice part and the other media part of the ongoing communication session. It should be noted that the Re-INVITE 3-7 may be replaced by two parallel Re-INVITEs (one for the voice part and one for the other media part). A benefit achieved by combining the Re-INVITES is that it is likely to cause minimal disruption to the ongoing communication session.

In summary, by having an indication of desired media split in both SIP INVITEs 3-3 and 3-6 the UE_A can be sure that the VCC AS always knows to wait for both invites. A benefit achieved by this embodiment is that the procedure may be fast. In FIG. 4 a UE_A sets up via a WLAN network a communication session with a UE_B the same way as in FIG. 3 by means of SIP INVITEs 3-1 and 3-2 and later on transfers to an UTRAN network.

Now the UE_A first sends only a SIP INVITE 3-3 for transferring the other media part. The VCC AS receives the SIP INVITE 3-3 and knows on the basis of the session identifier, and the VDI included in the invite that in this scenario media splitting needs to be performed. The VCC AS confirms to the UE_A that the SIP INVITE 3-3 has been received. The confirmation may be effected for example by responding with a reliably sent provisional response 4-4, such as a SIP 180 (Ringing) response or SIP 183 (Session Progress) response.

On receipt of the response 4-4 the UE_A knows that the SIP INVITE 3-3 has been received and that the VCC AS is waiting for an invite for the voice part. Then the UE_A sends a CS SETUP message 4-5 for transferring the voice part. A MGCF receives the CS SETUP message 4-5 and sends on the basis of that a SIP INVITE 4-6 comprising VDN as request URI. No indication of the desired media split is needed in the CS SETUP message 4-5 and the SIP INVITE 4-6 as the VCC AS already knows that media split is desired.

In a practical implementation as the response 4-4 is sent reliably, the UE_A may need to answer it with a PRACK (provisional response acknowledgement) request (not shown in FIG. 4). A benefit of sending the response reliably is that thereby the VCC AS can make sure, that the response 4-4 is received by the UE_A.

The same way as in FIG. 3, the VCC AS sends a Re-INVITE 3-7 to the UE_B after receiving both invites 3-3 and 4-6.

A benefit achieved by the embodiment of FIG. 4 is that the CS SETUP message does not need to be modified and no additional protocol elements are needed.

As an alternative to the specific example of FIG. 4 the CS SETUP may be sent first and the SIP INVITE 3-3 only after receiving confirmation that the CS SETUP has been received. In this case an indication is needed in the CS SETUP message as discussed above with reference to FIG. 3. That is, in this embodiment the response 4-4 is sent in response to the CS SETUP and the SIP INVITE 3-3 is sent in response to receiving the response 4-4.

As a further alternative to the embodiments discussed above, it is possible that a separate "indication message" comprising an indication of that media splitting is desired is sent first and both of the transfer requests (of the circuit switched/voice part and the packet switched/other media part) are sent only after a confirmation of the receipt of the indication message. In this way no changes are needed for the known transfer requests.

Such an indication message may be any suitable message. The indication comprised in the message may be, for example, an agreed bit pattern, which the application server knows to be an indication of that media splitting is desired. However as is evident to the skilled person, there are an infinite number of equivalent possibilities to implement such indication. The only requirement is that the application server needs to be able to recognize that the indication is an indication of that media splitting is desired. In some embodiments, a single bit in a field may suffice.

The invention may be implemented for example by means of a computer program running on a suitable hardware platform or by means of any other suitable combination of hardware, software, special purpose circuits and/or logic.

Figure 5:
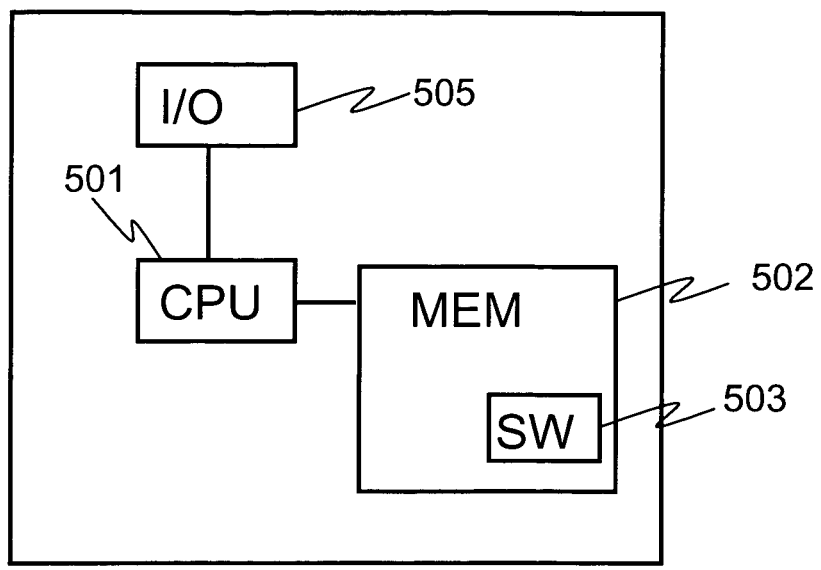
FIG. 5 shows a block diagram of an apparatus suited for implementing various embodiments of the invention.

FIG. 5 shows a block diagram of an apparatus 500 suited for implementing various embodiments of the invention. The apparatus 500 may be a typical computer, such as, a general-purpose computer or a server, with possibly distributed functions. The apparatus comprises a Central Processing Unit (CPU) 501 for controlling the apparatus and a memory 502 including a computer program code or software 503.

The software 503 includes instructions for the CPU 501 to control the operation of the apparatus 500. The software 503 may comprise instructions for controlling the apparatus to provide some functionality of the invention. The instructions may for example control the apparatus to operate as an application server according to some embodiments of the invention. The apparatus 500 further comprises an I/O (input/output) unit 505 such as a LAN (Local Area Network), Ethernet or WLAN (Wireless LAN) unit. The apparatus 500 could comprise also a user interface (not shown), such as a display and a keyboard, but the user interface may be implemented also by means of a remote connection through the I/O unit.

Figure 6:
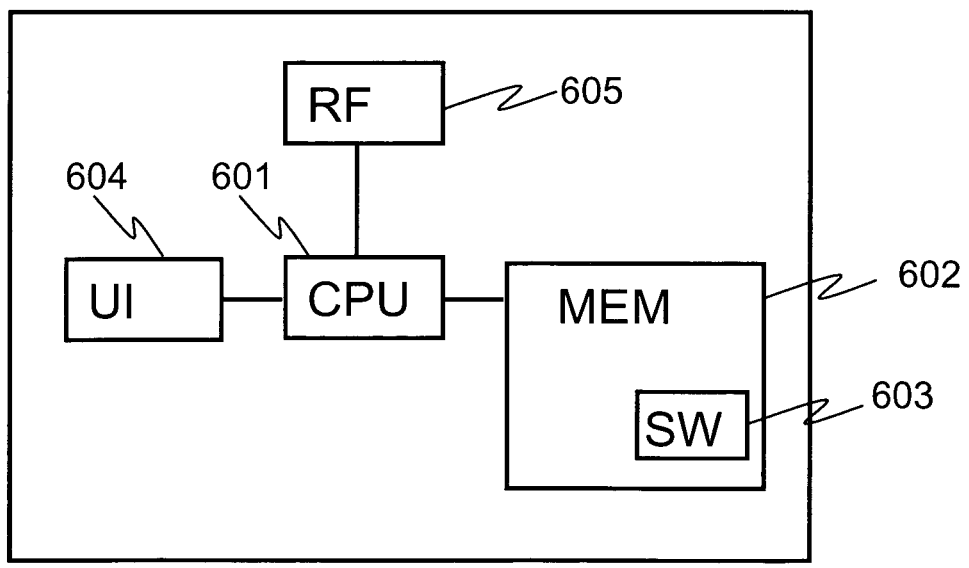
FIG. 6 shows a block diagram of a communication device suited for implementing various embodiments of the invention.

FIG. 6 shows a block diagram of a communication device 600 suited for implementing various embodiments of the invention. The communication device 600 may be for example a mobile phone, a smart phone or some other communication device. The communication device comprises a Central Processing Unit (CPU) 601 for controlling the apparatus and a memory 602 including a computer program code or software 603.

The software 603 includes instructions for the CPU 601 to control the operation of the communication device 600. The software 603, stored in memory 602, may comprise instructions for controlling the apparatus to provide some functionality of the invention. The apparatus 600 further comprises a RF unit 605 providing radio interfaces to communication networks. Further the apparatus 600 comprises a user interface for interacting with the user of the communication device. The user interface may comprise for example a display and a keyboard.

It should be appreciated that in this document, words comprise, include and contain are each used as open-ended expressions with no intended exclusivity.

Particular implementations and embodiments of the invention have been described by way of non-limiting examples relating to VCC and SIP INVITES. It is clear to a person skilled in the art that the invention is not restricted to details of the embodiments presented above, but that it can be implemented in other embodiments using equivalent means without deviating from the characteristics of the invention. Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method comprising
   participating, by a communication device, in an ongoing communication session via a packet switched network,
   causing said communication session to be transferred from the packet switched network to a second network providing both packet and circuit switched access,
   informing an application server maintaining said ongoing communication session that the communication session is to be split into a packet switched part and a circuit switched part;
   sending separate transfer requests for the packet switched part and the circuit switched part, wherein at least one of the separate transfer requests are sent from the communication device to the application server, and
   including at least in one of the separate transfer requests an indication that the communication session is to be split.

2. A method according to claim 1, wherein said indication is included in the transfer request of the packet switched part and said transfer request of the packet switched part is one of the following:
   an invite message comprising a domain transfer URI and a pointer to said communication session, and
   a SIP INVITE comprising VDI (VCC Domain Transfer URI) in Request URI and a session identifier pointing to said communication session.

3. A method according to claim 1, wherein said indication is included in the transfer request of the circuit switched part and said transfer request of the circuit switched part is one of the following:
   a setup message comprising said indication in a specific information element,
   a setup message with a specific domain transfer number, the specific domain transfer number constituting said indication,
   a CS SETUP message comprising said indication in a User-to-User-Signalling Information Element, and
   a CS SETUP message with a specific VDN (VCC Domain Transfer Number), the specific VDN constituting said indication.

4. A method according to claim 1, wherein said informing is conducted by
   sending in parallel the transfer requests of the packet switched part and the circuit switched part, both of the transfer requests comprising an indication that the communication session is to be split.

5. A method according to claim 1, wherein said informing is conducted by
   sending the transfer request of the packet switched part, the request comprising said indication that the communication session is to be split,
   waiting for to receive a response to the transfer request for the packet switched part, and
   sending the transfer request of the circuit switched part in response to receiving said response.

6. A method according to claim 1, wherein said informing is conducted by
   sending the transfer request of the circuit switched part, the request comprising an indication that the communication session is to be split,
   waiting for to receive a response to the transfer request for the packet switched part, and
   sending the transfer request of the packet switched part in response to receiving said response.

7. A method according to claim 1, wherein said informing is conducted by:
   sending an indication message comprising an indication that the communication session is to be split,
   waiting for to receive a response to the indication message, and
   sending transfer requests of the packet switched part and the circuit switched part in response to receiving said response.

8. A method in an application server, comprising
   receiving, from a first communication device, an indication that a communication session between the first communication device and a second communication device is to be split into a packet switched part and a circuit switched part,
   waiting to receive separate transfer requests for both the packet switched part and the circuit switched part, and
   informing the second communication device of the transfers of the packet switched part and the circuit switched part.

9. A method according to claim 8, further comprising
   receiving said indication as part of at least one of the transfer request of the packet switched part or the transfer request of the circuit switched part.

10. A method according to claim 9, wherein said indication is received as part of a transfer request of the packet switched part and said transfer request of the packet switched part is one of the following:
    an invite message comprising a domain transfer URI and a pointer to said communication session, and
    a SIP INVITE comprising VDI (VCC Domain Transfer URI) in Request URI and session identifier pointing to said communication session.

11. A method according to claim 9, wherein said indication is received as part of a transfer request of the circuit switched part and said transfer request of the circuit switched part is one of the following:
    an invite message comprising said indication in a specific information element,
    an invite message with a specific domain transfer number, the specific domain transfer number constituting said indication,
    a SIP INVITE comprising said indication in a User-to-User-Signalling Information Element, and
    a SIP INVITE with a specific VDN (VCC Domain Transfer Number), the specific VDN constituting said indication.

12. A method according to claim 9, further comprising
    receiving said indication as part of both of the transfer requests of the packet switched part and the circuit switched part.

13. A method according to claim 9, further comprising
    receiving said indication as part of the transfer request of the packet switched part,
    sending a response confirming receipt of the transfer request of the packet switched part, and
    waiting for to receive the transfer request of the circuit switched part.

14. A method according to claim 9, further comprising
receiving said indication as part of the transfer request of the circuit switched part,
sending a response confirming receipt of the transfer request of the circuit switched part, and
waiting for to receive the transfer request of the packet switched part.

15. A method according to claim 8, further comprising
receiving an indication message comprising said indication,
sending a response confirming receipt of the indication message, and
waiting for to receive transfer requests of the packet switched part and the circuit switched part.

16. A communication device comprising at least one processor and at least one memory including computer program code, the at least one memory and the computer program code configured to, with the at least one processor, cause the device to at least:
participate in an ongoing communication session via a packet switched network,
transfer said communication session from the packet switched network to a second network providing both packet and circuit switched access, wherein the at least one processor is further configured to inform an application server maintaining said ongoing communication session that the communication session is to be split into a packet switched part and a circuit switched part;
wherein said at least one processor is further configured:
to send separate transfer requests for the packet switched part and the circuit switched part, and
to include at least in one of the separate transfer requests an indication that the communication session is to be split, wherein at least one of the separate transfer requests are sent from the communication device to the application server.

17. A communication device according to claim 16, wherein said indication is arranged to be included in the transfer request of the packet switched part and said transfer request of the packet switched part is one of the following:
an invite message comprising a domain transfer URI and a pointer to said communication session, and
a SIP INVITE comprising VDI (VCC Domain Transfer URI) in Request URI and a session identifier pointing to said communication session.

18. A communication device according to claim 16, wherein said indication is arranged to be included in the transfer request of the circuit switched part and said transfer request of the circuit switched part is one of the following:
a setup message comprising said indication in a specific information element,
a setup message with a specific domain transfer number, the specific domain transfer number constituting said indication,
a CS SETUP message comprising said indication in a User-to-User-Signalling Information Element, and
a CS SETUP message with a specific VDN (VCC Domain Transfer Number), the specific VDN constituting said indication.

19. A communication device according to claim 16, wherein said at least one processor is further configured to send in parallel the transfer requests of the packet switched part and the circuit switched part, both of the transfer requests comprising an indication that the communication session is to be split.

20. A communication device according to claim 16, wherein said at least one processor is further configured
to send the transfer request of the packet switched part, the request comprising said indication that the communication session is to be split,
to wait for to receive a response to the transfer request for the packet switched part, and
to send the transfer request of the circuit switched part in response to receiving said response.

21. A communication device according to claim 16, wherein said at least one processor is further configured
to send the transfer request of the circuit switched part, the request comprising an indication that the communication session is to be split,
to wait for to receive a response to the transfer request for the packet switched part, and
to send the transfer request of the packet switched part in response to receiving said response.

22. A communication device according to claim 16, wherein said at least one processor is further configured:
to send an indication message comprising an indication that the communication session is to be split,
to wait for to receive a response to the indication message, and
to send transfer requests of the packet switched part and the circuit switched part in response to receiving said response.

23. An application server, comprising
an input operable to receive, from a first communication device, an indication that a communication session between the first communication device and a second communication device is to be split into a packet switched part and a circuit switched part, and
a processing unit configured to wait for to receive separate transfer requests for both the packet switched part and the circuit switched part, and to inform the second communication device of the transfers of the packet switched part and the circuit switched part.

24. An application server according to claim 23, wherein said input is operable to receive said indication as part of at least one of the separate transfer request for the packet switched part and the transfer request for the circuit switched part.

25. An application server according to claim 24, wherein said indication is arranged to be received as part of a transfer request of the packet switched part and said transfer request of the packet switched part is one of the following:
an invite message comprising a domain transfer URI and a pointer to said communication session, and
a SIP INVITE comprising VDI (VCC Domain Transfer URI) in Request URI and session identifier pointing to said communication session.

26. An application server according to claim 24, wherein said indication is arranged to be received as part of a transfer request of the circuit switched part and said transfer request of the circuit switched part is one of the following:
an invite message comprising said indication in a specific information element,
an invite message with a specific domain transfer number, the specific domain transfer number constituting said indication,
a SIP INVITE comprising said indication in a User-to-User-Signalling Information Element, and
a SIP INVITE with a specific VDN (VCC Domain Transfer Number), the specific VDN constituting said indication.

27. An application server according to claim 24, wherein
said input is operable to receive said indication as part of the transfer request of the packet switched part, and
said processing unit is configured to send a response confirming receipt of the transfer request of the packet switched part, and to wait for to receive the transfer request of the circuit switched part.

28. An application server according to claim 24, wherein
said input is operable to receive said indication as part of the transfer request of the circuit switched part, and
said processing unit is configured to send a response confirming receipt of the transfer request of the circuit switched part, and to wait for to receive the transfer request of the packet switched part.

29. An application server according to claim 23, wherein
said input is operable to receive an indication message comprising said indication, and
said processing unit is configured to send a response confirming receipt of the indication message, and to wait for to receive transfer requests of the packet switched part and the circuit switched part.

30. A system, comprising
a first communication device,
a second communication device, and
an application server, wherein
the first and the second communication device are operable to participate in an ongoing communication session between them via a packet switched network,
the first communication device comprises a processing unit configured to transfer said communication session from the packet switched network to a second network providing both packet and circuit switched access, and to provide to the application server an indication that the communication session is to be split into a packet switched part and a circuit switched part, and wherein
the application server comprises an input operable to receive said indication and a processing unit configured to wait for and to receive separate transfer requests for both the packet switched part and the circuit switched part, and to inform the second communication device of the transfers of the packet switched part and the circuit switched part.

31. A memory medium comprising computer executable program code adapted to enable an apparatus to perform the method of claim 1.

32. A memory medium comprising computer executable program code adapted to enable an apparatus to perform the method of claim 8.

* * * * *